United States Patent [19]
Sato et al.

[11] Patent Number: 5,437,154
[45] Date of Patent: Aug. 1, 1995

[54] MISFIRE-DETECTING SYSTEM FOR INTERNAL COMBUSTION ENGINES

[75] Inventors: Toshihiko Sato; Tsuyoshi Takizawa; Yoichi Iwata; Hiroshi Ito, all of Wako; Takayoshi Nakayama, Tochigi, all of Japan

[73] Assignee: Honda Giken Kogyo Kabushiki Kaisha, Tokyo, Japan

[21] Appl. No.: 207,668

[22] Filed: Mar. 9, 1994

[30] Foreign Application Priority Data

Mar. 19, 1993 [JP] Japan ................................. 5-085324

[51] Int. Cl.⁶ .............................................. F01N 3/20
[52] U.S. Cl. ......................................... 60/276; 60/277
[58] Field of Search ........................... 60/274, 276, 277

[56] References Cited
U.S. PATENT DOCUMENTS 5,069,035 12/1991 Kayanuma ........................... 60/277
5,168,859 12/1992 Ohsaki ................................ 123/681

FOREIGN PATENT DOCUMENTS 4-81548 3/1992 Japan.

Primary Examiner—Douglas Hart
Attorney, Agent, or Firm—Nikaido, Marmelstein, Murray & Oram

[57] ABSTRACT

A misfire-detecting system for an internal combustion engine has an ECU which detects a value of a parameter representative of a misfiring state of the engine, and also detects the deterioration degree of a catalytic converter arranged in the engine exhaust system. The ECU sets a misfire-determining reference value, based on the detected deterioration degree of the catalytic converter, compares between the detected value of the above parameter and the misfire-determining reference value, and determines whether the engine is in a misfiring state, based on the result of the comparison.

9 Claims, 19 Drawing Sheets

MISFIRE-DETECTING SYSTEM FOR INTERNAL COMBUSTION ENGINES

BACKGROUND OF THE INVENTION

1. Field of the Invention

This invention relates to a misfire-detecting system for an internal combustion engine, and more particularly to a misfire-detecting system which is adapted to detect a misfire attributable to the fuel supply system.

2. Prior Art

There are conventionally known various kinds of misfire-detecting systems for internal combustion engines, as proposed, for example, by Japanese Provisional Patent Publication (Kokai) No. 4-81548 by the present assignee, which finally determines that the engine is in a misfiring state when misfires have occurred in the engine at a predetermined rate or more, and then alerts the driver to take an appropriate failsafe action to prevent component parts of the exhaust system, especially a catalytic converter for purifying exhaust gas components, of the engine, from being adversely affected by misfires.

In the above proposed conventional system, however, the predetermined misfiring rate is set on the premise that the catalytic converter is normally functioning. As a result, when the catalytic converter has a deteriorated purifying ability, there is a fear that the engine suffers from degraded exhaust emission characteristics before the engine is determined to be in a misfiring state.

In addition, when the purifying ability of the catalytic converter is further deteriorated, occurrence of misfires accelerates the deterioration of the purifying ability, which may result in a shortened life of the catalytic converter.

SUMMARY OF THE INVENTION

It is the object of the invention to provide a misfire-detecting system for internal combustion engines, which is capable of properly performing misfire determination even if the catalytic converter has a deteriorated purifying ability, thereby preventing degradation of exhaust emission characteristics of the engine as well as restraining advancement of deterioration of the catalytic converter.

To attain the above object, the present invention provides a misfire-detecting system for an internal combustion engine having an exhaust system, and a catalytic converter arranged in the exhaust system, comprising:

misfire parameter-detecting means for detecting a value of a parameter representative of a misfiring state of the engine;

catalyst deterioration degree-detecting means for detecting a deterioration degree of the catalytic converter;

misfire-determining reference value-setting means for setting a misfire-determining reference value, based on the deterioration degree of the catalytic converter detected by the catalyst deterioration degree-detecting means; and misfire-determining means for comparing between the value of the parameter detected by the misfire parameter-detecting means and the misfire-determining reference value, and for determining whether the engine is in a misfiring state, based on a result of the comparison.

Preferably, the misfire-determining reference value-setting means sets the misfire-determining reference value such that as the detected deterioration degree of the catalytic converter is higher, the probability that the engine is determined to be in the misfiring state increases.

Also preferably, the parameter detected by the misfire parameter-detecting means comprises a parameter indicative of rotational speed variations of the engine.

Alternatively, the parameter detected by the misfire parameter-detecting means comprises a parameter indicative of sparking voltage generated in the engine.

Also preferably, the misfire-detecting system includes oxygen concentration-detecting means arranged in the exhaust system downstream of the catalytic converter, and wherein the catalyst deterioration degree-detecting means detects the deterioration degree of the catalytic converter, based on an inversion time period of an output from the oxygen concentration-detecting means.

More preferably, the misfire-determining reference value-setting means sets the misfire-determining reference value, based on the inversion time period of the output from the oxygen concentration-detecting means.

Further preferably, the misfire-detecting system further includes counter means for measuring a misfiring rate of the engine over a predetermined number of rotations of the engine, engine abnormality-determining means for determining that the engine is in an abnormal state, when the misfiring rate of the engine measured by the counter means exceeds a misfiring rate reference value, and misfiring rate reference value-setting means for setting the misfiring rate reference value, based on the deterioration degree of the catalytic converter detected by the catalyst deterioration degree-detecting means.

Still further preferably, the misfiring rate reference value comprises at least one of a first reference value at and above which an amount of unburnt gases emitted from the engine exceeds a maximum allowable amount, and a second reference value at and above which the catalytic converter is badly affected by occurrence of misfiring in the engine.

The above and other objects, features, and advantages of the invention will be more apparent from the following detailed description taken in conjunction with the accompanying drawings.

BRIEF DESCRIPTION OF THE DRAWINGS

FIGS. 7(a), 7(b) and 7(c) are flowcharts showing programs for determining a misfiring state of the engine, in which:

FIG. 7(a) shows a CRK processing which is executed in synchronism with generation of a crank angle (CRK) signal;

FIG. 7(b) shows a TDC processing which is executed in synchronism with generation of a top dead center (TDC) signal; and FIG. 7(c) shows a #3STG processing which is executed with the same repetition period as that of the TDC processing;

FIGS. 17(a) to 17(e) collectively form a timing chart useful in explaining the operation of the misfire-detecting circuit in FIG. 16, in which:

FIG. 17(a) shows an ignition command signal A;

FIG. 17(b) shows changes in the detected sparking voltage V and a comparative level VCOMP;

FIG. 17(c) shows changes in an output from a comparator;

FIG. 17(d) shows the relationship between a count value CP and a reference value CPREF; and FIG. 17(e) shows changes in a flag IG;

DETAILED DESCRIPTION

The invention will now be described in detail with reference to the drawings showing embodiments thereof.

Figure 1:
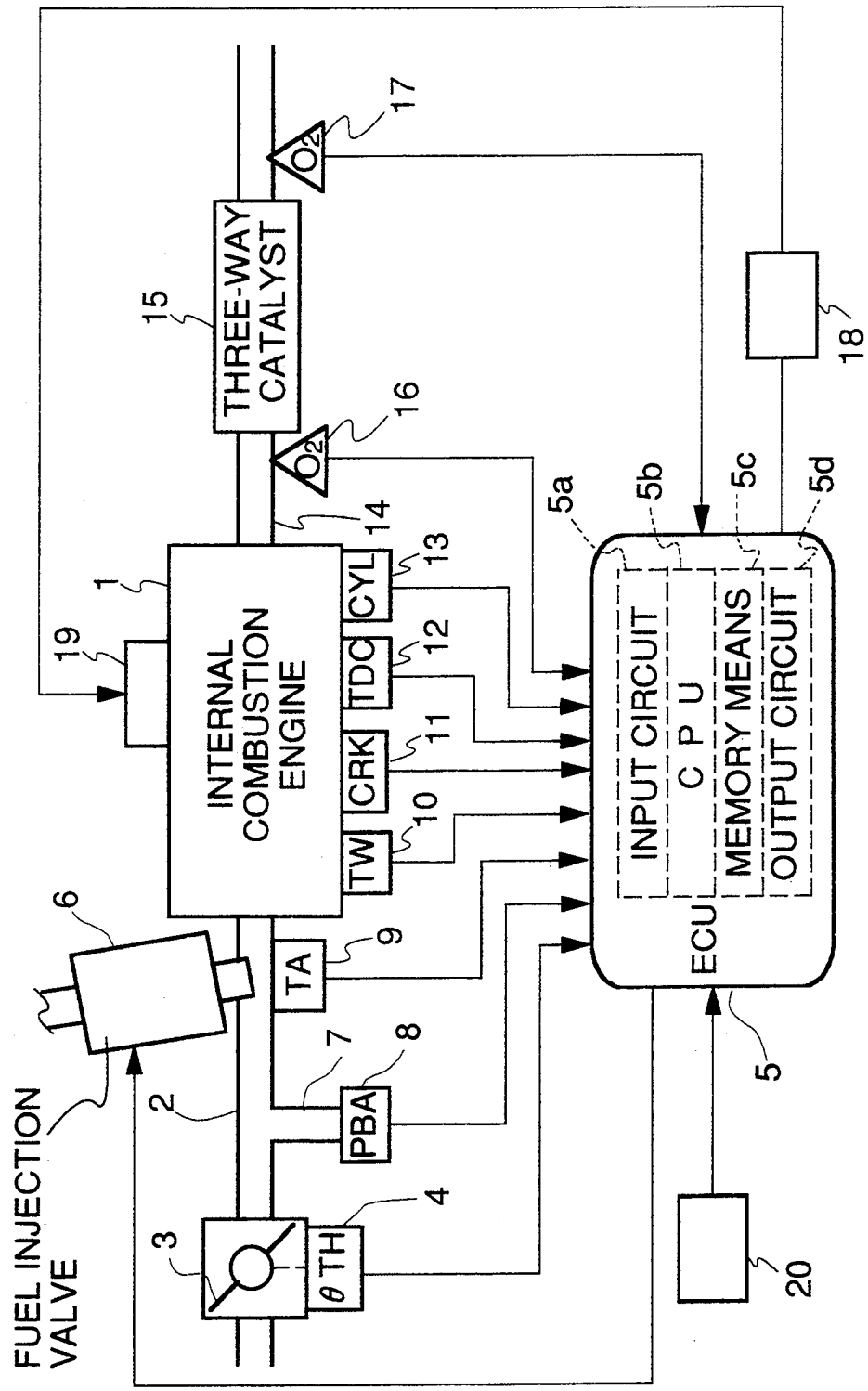
FIG. 1 is a block diagram showing the whole arrangement of an internal combustion engine and a misfire-detecting system therefor, according to an embodiment of the invention.

Referring first to FIG. 1, there is shown the whole arrangement of an internal combustion engine and a misfire-detecting system therefor, according to an embodiment of the invention. In an intake pipe 2 of the engine 1, there is arranged a throttle valve 3, to which is connected a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "CYL signal pulses") at a predetermined crank angle of a particular cylinder of the engine 1. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees in the case where the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 19, which is electrically connected via a distributor 18 to the ECU 5.

A three-way catalyst (catalytic converter) 15 is arranged in an exhaust pipe 14 of the engine 1 for purifying components of HC, CO, NOx, and the like present in the exhaust gases. Arranged in the exhaust pipe 14 at respective locations upstream and downstream of the three-way catalyst 15 are oxygen concentration sensors 16 and 17 (hereinafter referred to as "the upstream O2 sensor" and "the downstream O2 sensor", respectively) as air-fuel ratio sensors, for detecting the concentration of oxygen present in the exhaust gases at the respective locations, and supplying signals indicative of the sensed oxygen concentration to the ECU 5.

Further connected to the ECU 5 are various sensors 20, such as an atmospheric pressure sensor for detecting atmospheric pressure, and a vehicle speed sensor for detecting the traveling speed of an automotive vehicle on which the engine is installed, and signals indicative of the sensed values are supplied to the ECU 5.

The ECU 5 comprises an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6.

The CPU 5b operates in response to the above-mentioned various engine parameter signals from the various sensors to determine operating conditions in which the engine 1 is operating, such as feedback control regions where the air-fuel ratio is controlled in response to the detected oxygen concentration in the exhaust gases, and open-loop control regions, and calculates, based upon the determined engine operating conditions, a fuel injection period Tout over which the fuel injection valve 6 is to be opened, in synchronism with generation of TDC signal pulses, by the use of the following equation (1):

$$Tout = Ti \times KO2 \times K1 + K2 \quad (1)$$

where Ti represents a basic fuel amount, i.e. a basic value of the fuel injection period Tout, which is determined according to the engine rotational speed NE and the intake pipe absolute pressure PBA. A Ti map for determining the Ti value is stored in the memory means 5c.

KO2 represents an air-fuel ratio correction coefficient which is determined based on outputs from the upstream and downstream O2 sensors 16 and 17. The correction coefficient KO2 is set to a value such that the air-fuel ratio detected by the upstream O2 sensor 16 becomes equal to a desired value when the engine 1 is operating in each air-fuel ratio feedback control region, while it is set to predetermined values corresponding to the respective operating regions of the engine when the engine 1 is in the open-loop control regions.

K1 and K2 represent other correction coefficients and correction variables, respectively, which are set according to engine operating parameters to such values as optimize engine operating characteristics, such as fuel consumption and engine accelerability.

The CPU 5b further calculates the ignition timing $\theta$IG of the engine 1 in response to engine operating conditions, and supplies, via the output circuit 5d, signals for driving the fuel injection valves 6, based on the fuel injection period Tout and signals for driving the spark plugs 19, based on the $\theta$ IG value.

Figure 2:
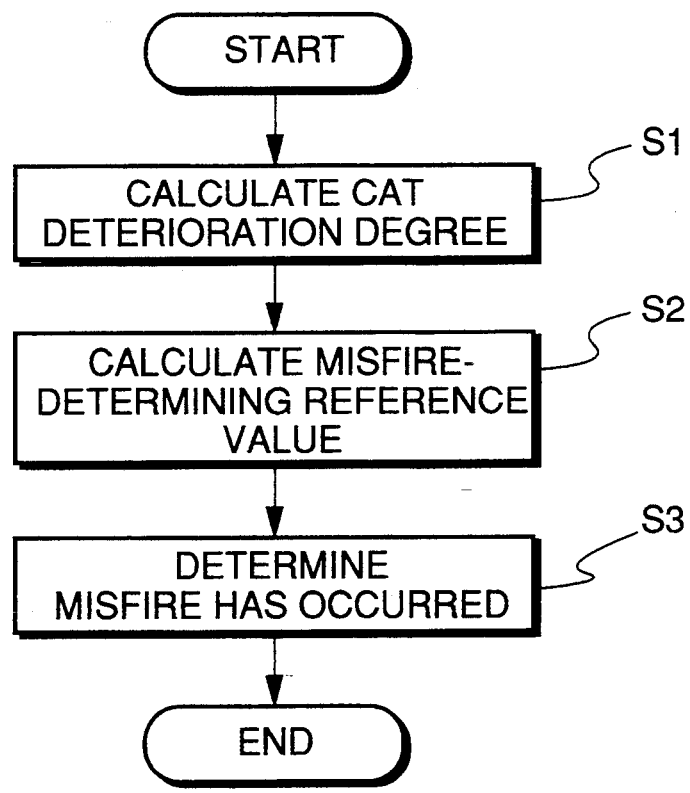
FIG. 2 is a flowchart showing a main routine for determining a misfiring state of the engine.

FIG. 2 shows a main routine for carrying out misfire determination, which is executed by the CPU 5b of the engine 1.

At a step S1, a deterioration degree of the three-way catalyst 15 is calculated, and then at a step S2, a misfire-determining reference value MSLMT is calculated in response to the above calculated deterioration degree, to thereby execute misfire determination at a step S3, based on the thus calculated reference value.

Details of the above steps S1 to S3 will be described hereinbelow:

(1) Calculation of Deterioration Degree of Catalyst

Figure 4:
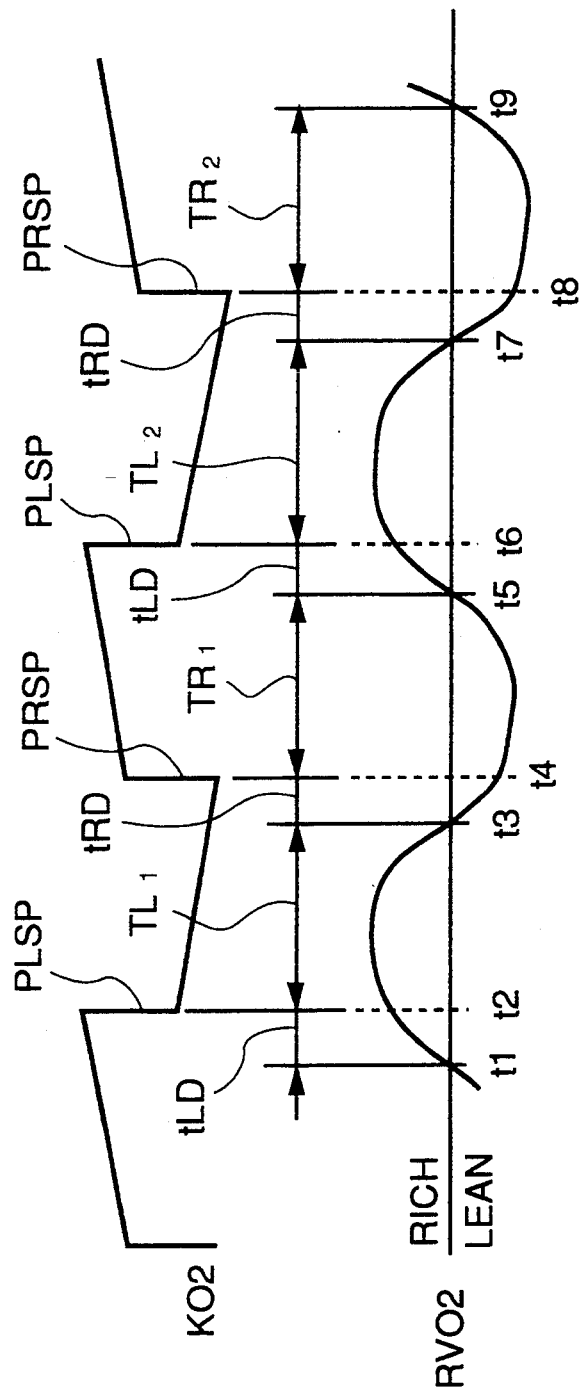
FIG. 4 is a timing chart useful in explaining a manner of calculating a parameter TCHK representative of the deterioration degree of the catalyst.

As shown in FIG. 4, during execution of feedback control in which the correction coefficient KO2 is calculated based only on the output RVO2 from the downstream O2 sensor 16, calculations are made of a time period TL from a time point a special P term PLSP for skipping the KO2 value in the decreasing direction is generated to a time point the O2 sensor output RVO2 is inverted, and a time period TR from a time point a special P term PRSP for skipping the KO2 value in the increasing direction is generated to a time point the O2 sensor output RVO2 is inverted. Calculation of the deterioration degree of the catalyst performance is carried out based on the thus obtained time periods TL and TR.

Figure 3:
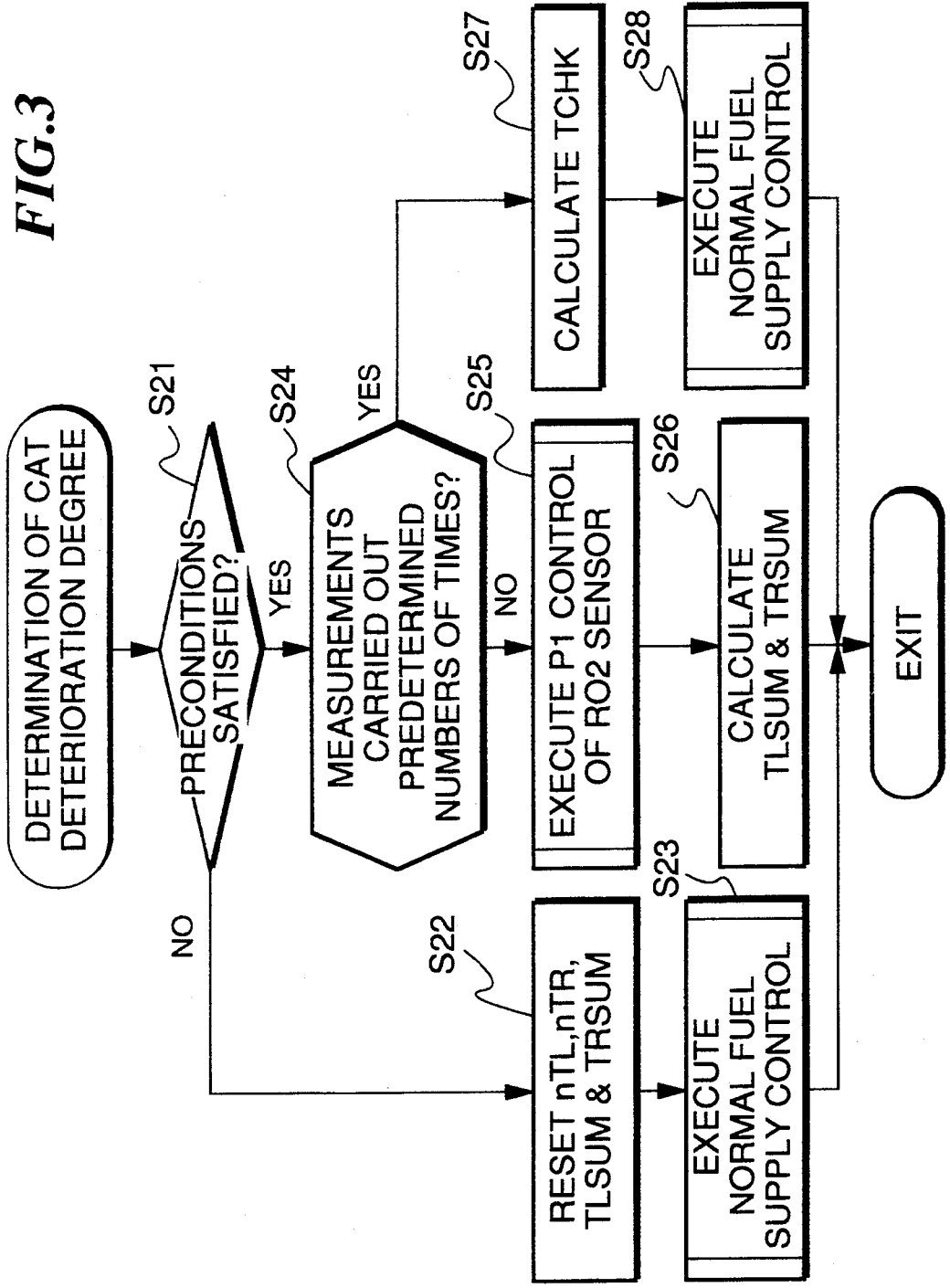
FIG. 3 is a flowchart showing a subroutine for determining the deterioration degree of a three-way catalyst.

FIG. 3 shows a subroutine for calculating the deterioration degree of the catalyst 15. At a step S21 in the figure, it is determined whether or not preconditions for carrying out the calculation of the deterioration degree are satisfied. The preconditions are satisfied when certain engine operating parameters, such as engine rotational speed NE, and intake pipe absolute pressure PBA, are within respective predetermined ranges while the engine is operating in a steady condition.

If the preconditions are not satisfied, the program proceeds to a step S22, where cumulative values TLSUM and TRSUM of the respective time periods TL and TR, and numbers of times of calculation nTL and nTR thereof are reset, and then normal fuel supply control is carried out at a step S23. In the normal fuel supply control, when the engine is in an air-fuel ratio feedback control region, the correction coefficient KO2 is calculated by feedback control based on the outputs from the O2 sensors 16 and 17, while the KO2 value is set to a predetermined value corresponding to the engine operating condition when the engine is in each open loop control region.

If the preconditions are satisfied, the program proceeds to a step S24, where it is determined whether or not the measurements of the TL and TR values have been carried out predetermined numbers of times, respectively. In the first loop of execution of the program, the answer to the question at the step S24 becomes negative (NO), and therefore the program proceeds to a step S25, where PI (proportional integral) control based only on the downstream O2 sensor output RVO2 is executed, and the TL and TR values are measured to calculate the respective cumulative values TLSUM and TRSUM thereof at a step S26.

Specifically, as shown in FIG. 4, at a time point t2 a predetermined time period tLD has elapsed after a time point t1 a lean-to-rich inversion of the downstream O2 sensor output RVO2 occurred, the KO2 value is skipped in the decreasing direction using the leaning special P term PLSP, and then I term control is executed by progressively decreasing the KO2 value until a time point t4 a predetermined time period tRD has elapsed after a time point t3 a rich-to-lean inversion of the sensor output RVO2 occurred. The time period from the time point t2 to the time point t3 is measured as a TL value (TL$_1$). Next, at the time point t4, the KO2 value is skipped in the increasing direction by the use of the enriching special P term PRSP, and then I term control is executed by progressively increasing the KO2 value until a time point t6 a predetermined time period tLD has elapsed after a time point t5 a lean-to-rich inversion of the sensor output RVO2 occurred. The time period from the time point t4 to the time point t5 is measured as a TR value ($TR_1$). Thereafter, $TL_2$, $TR_2$, . . . are successively measured in the same manner as above, followed by calculating cumulative values TLSUM and TRSUM of the measured TL and TR values.

If the answer to the question at the step S24 is affirmative (YES), i.e. if the measurements have been carried out the predetermined numbers of times, respectively, a determination time period TCHK, which is a parameter representative of the deterioration degree of the catalyst, is calculated by the use of the following equation (2) at a step S27:

$$TCHK = (TLSUM/nTL + TRSUM/nTR)/2 \qquad (2)$$

Thereafter, the normal fuel supply control is carried out at a step S28, similarly to the step S23.

Figure 5:
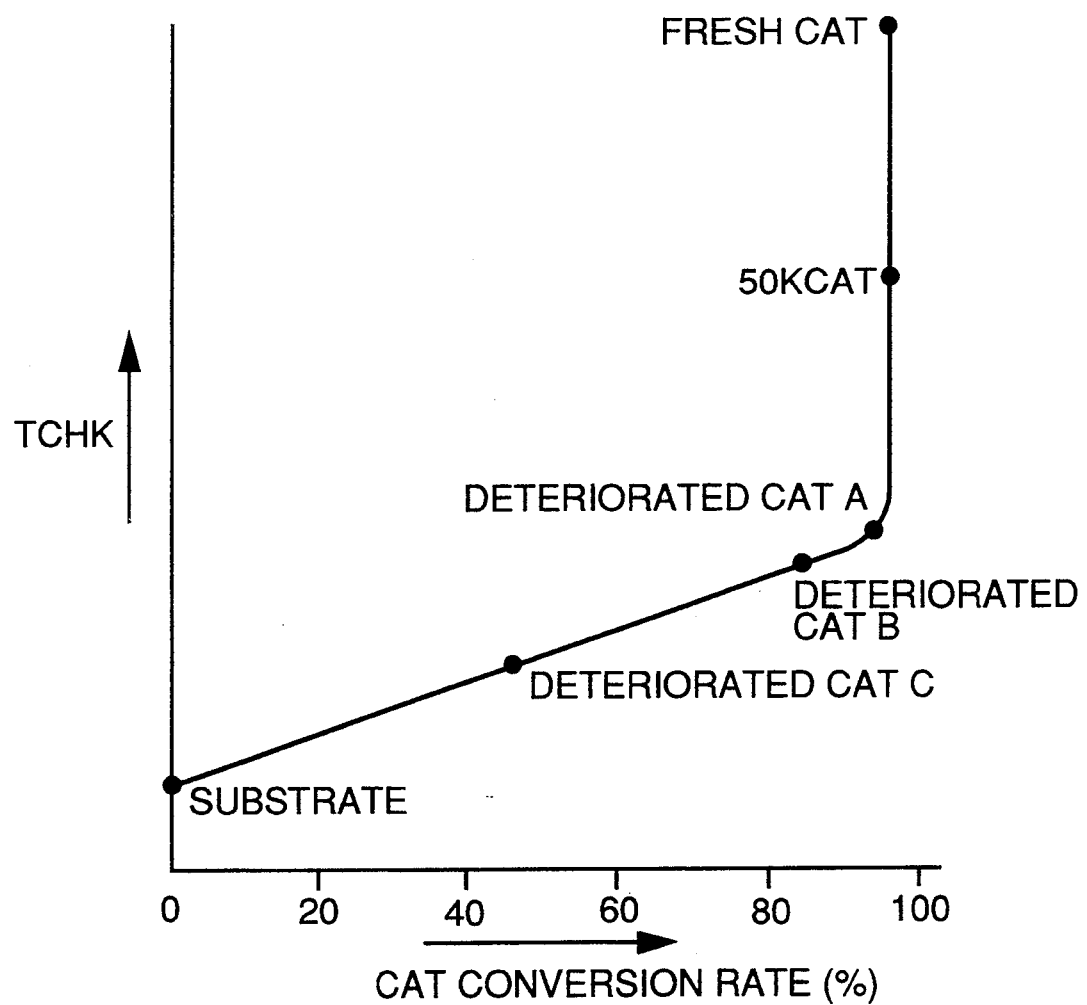
FIG. 5 is a graph showing the relationship between the purification rate of the three-way catalyst and the parameter TCHK.

The average value TCHK of the time periods TL and TR and the purification rate of the catalyst (CAT conversion rate) are in the relationship as shown in FIG. 5, wherein the average value TCHK decreases as the purification rate of the catalyst is deteriorated. Therefore, in the figure, within a range where the TCHK value decreases as the purification rate is deteriorated, the TCHK value represents the deterioration degree of the catalyst (degradation degree of the purification rate). The purification rate of the catalyst depends on the oxygen storage capacity (O2 storage capacity) of the catalyst, so that a decrease in the determination time period TCHK means a degradation in the O2 storage capacity. Thus, by calculating the determination time period TCHK, the deterioration degree of the catalyst can be accurately obtained.

(2) Calculation of Misfire Determining-Reference Value

The misfire-determining reference value MSLMT, which is to be used at a step in FIG. 12, described hereinbelow, for determining whether or not a misfire has occurred in a particular cylinder is calculated by the use of the following equation (3):

$$MSLMT = MSLMTM + KMSLMT \qquad (3)$$

where MSLMTM represents a basic reference value which is read out from a map, and which is set in accordance with the engine rotational speed NE and the engine load (intake pipe absolute pressure PBA). The MSLMTM value is set to a smaller value as the engine rotational speed NE increases, and to a larger value as the engine load increases. The above setting contemplates the fact that the combustion period becomes longer as the engine rotational speed decreases, resulting in a larger variation in the engine rotational speed, and the fact that the output torque of the engine becomes larger as the load on the engine increases, resulting in a larger variation in the torque.

Figure 6A:
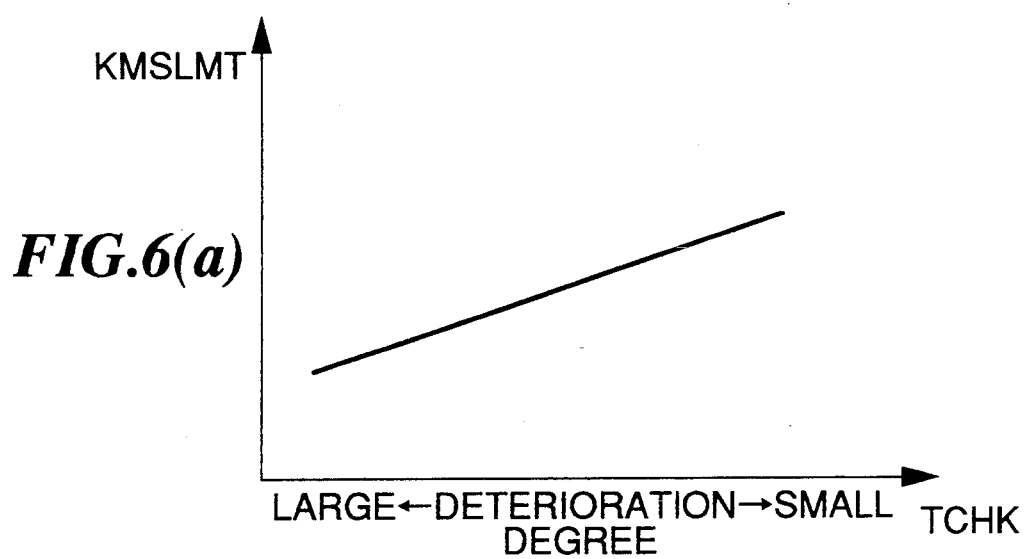
FIG. 6(a) is a graph showing the relationship between the parameter TCHK and a correction value KMSLMT for correcting a misfire-determining reference value MSLMT.

KMSLMT represents, as shown in FIG. 6(a), a correction value calculated in response to the determination time period TCHK, which is set to a smaller value as the TCHK value becomes smaller. More specifically, the KMSLMT value is set to a smaller value as the deterioration degree of the catalyst advances, so that the reference value MSLMT is corrected to a smaller value. In the FIG. 12 processing, if a misfire-determining parameter MS (cumulative value of differences) exceeds the MSLMT value, it is determined that a misfire has occurred, and therefore the MSLMT value is corrected by the correction value KMSLMT so that the possibility of determining that a misfire has occurred is increased as the deterioration degree of the catalyst advances.

(3) Misfire Determination

The manner of misfire determination will be described with reference to FIGS. 7 to 15.

Figure 7A:
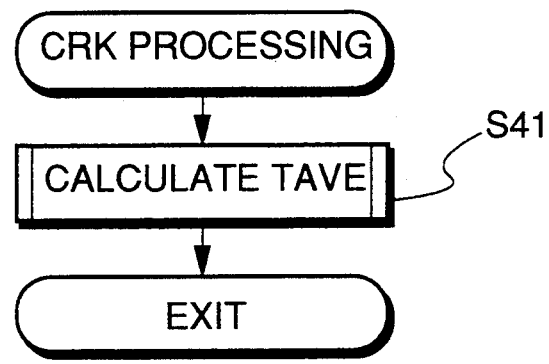
Figure 7B:
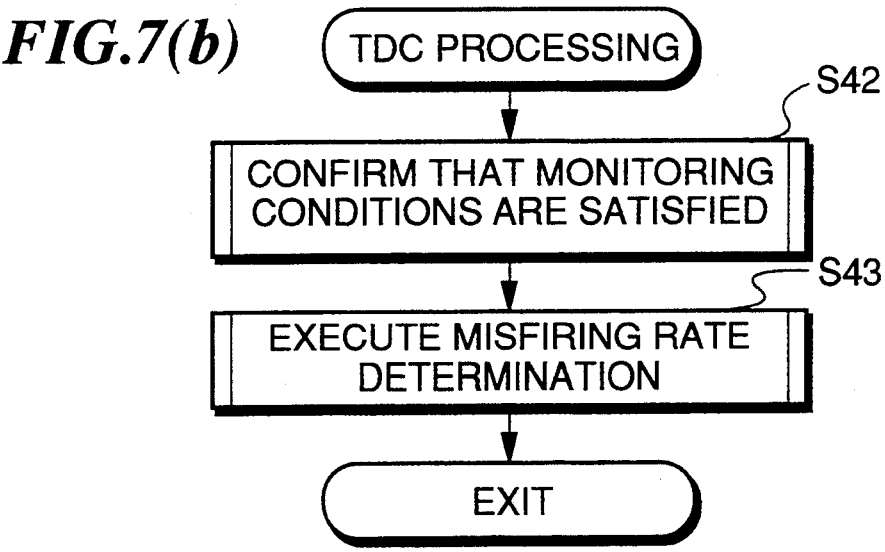
Figure 7C:
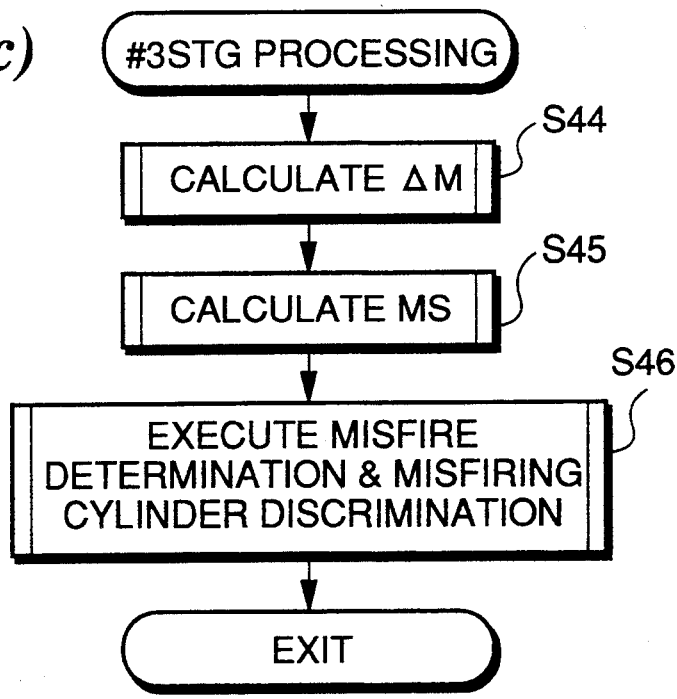

FIGS. 7(a), 7(b) and 7(c) show programs for determining a misfiring state of the engine 1.

FIG. 7(a) shows a CRK processing carried out in synchronism with generation of CRK signal pulses. At a step S41 of the program, an average value TAVE (hereinafter referred to as "the first average value") of time intervals of occurrence of CRK signal pulses is calculated. The time intervals are proportional to the reciprocal of the engine rotational speed.

FIG. 7(b) shows a TDC processing carried out in synchronism with generation of TDC signal pulses. At a step S42, it is determined whether or not monitoring conditions for permitting determination of a misfiring state are satisfied, i.e. whether or not the misfire determination can be carried out, and then abnormality determination (misfiring rate determination) is carried out at a step S43, based on the number of times of misfire occurrence determined by a #3STG processing in FIG. 7(c), described hereinafter.

The monitoring conditions are satisfied, for example, when the engine is in a steady operating condition, and at the same time the engine coolant temperature TW, the intake air temperature TA, the engine rotational speed NE, etc. are all within respective predetermined ranges.

Figure 9:
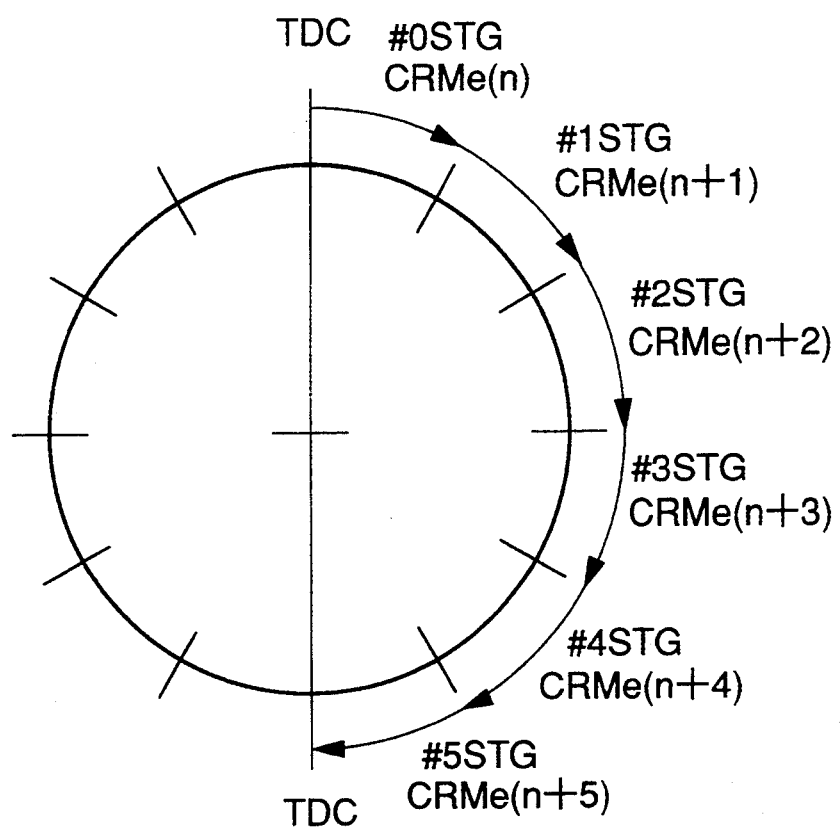
FIG. 9 is a diagram showing the relationship between measurement of a parameter CRMe representative of the engine rotational speed and the rotational angle of a crankshaft.

FIG. 7(c) shows a processing which is executed with the same repetition period as the TDC processing at a #3 stage #3STG (see FIG. 9). At a step S44, a rate of variation ΔM in an average value M (hereinafter referred to as "the second average value") of the first average value TAVE calculated in the CRK processing is calculated, and then at a step S45 the cumulative value MS of values of the difference between the rate of variation ΔM and an average value thereof is calculated, followed by determining at a step S46 whether or not a misfire has occurred in the engine 1 and discriminating which cylinder has misfired, based on the calculative value MS.

Figure 8:
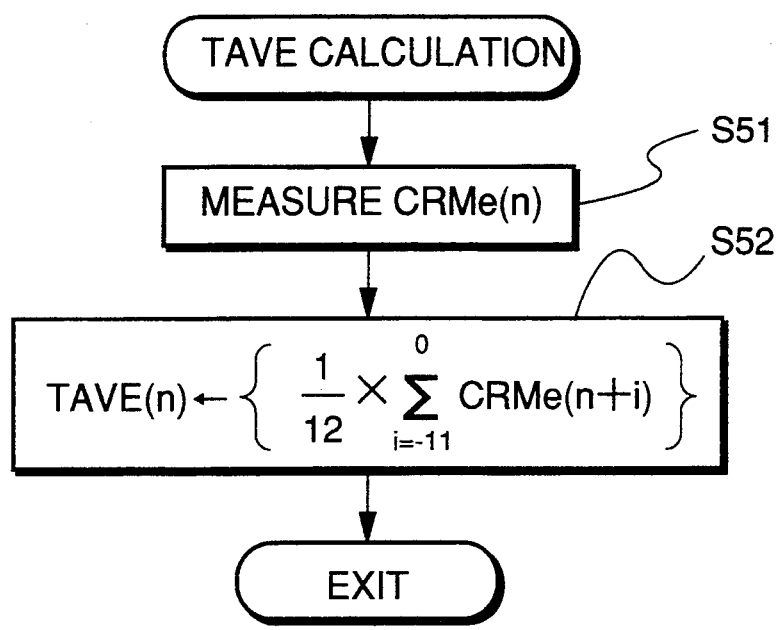
FIG. 8 is a flowchart showing a subroutine for calculating an average value TAVE, which is executed at a step of the FIG. 7(a) program.

FIG. 8 shows a subroutine for calculating the first average value TAVE at the step S41 of the FIG. 7(a) program. At a step S51, time intervals CRMe(n) of occurrence of CRK signal pulses are calculated. More specifically, time interval values of CRMe(n), CRMe(n+1), CRMe(n+2) . . . are successively measured whenever the crankshaft rotates through 30 degrees, as shown in FIG. 9.

A time period over which the crankshaft rotates through 180 degrees is divided every 30 degrees, and the divided time periods are designated as #0STG to #5STG (#0 stage to #5 stage), respectively.

At a step S52, a first average value TAVE(n) is calculated, which is an average value of 12 CRMe values from a value CRMe(n-11) measured eleven loops before the present loop to a value CRMe(n) in the present loop, by the use of the following equation (4):

$$TAVE(n) = 1/12 \times \sum_{i=-11}^{0} CRMe(n+i) \quad (4)$$

In the present embodiment, since CRK signal pulses are each generated whenever the crankshaft rotates through 30 degrees, the first average value TAVE(n) is an average value obtained over one rotation of the crankshaft. The first average value TAVE(n) obtained by such averaging every period of one rotation of the crankshaft is free of the influence of primary vibration components in engine rotation over a period of one rotation of the crankshaft, i.e. noise components due to dimensional errors (such as manufacturing tolerances and mounting tolerances) of a pulse or a pickup forming the crank angle sensor 11.

The engine rotational speed NE is also calculated based on the TAVE(n) value.

Figure 10:
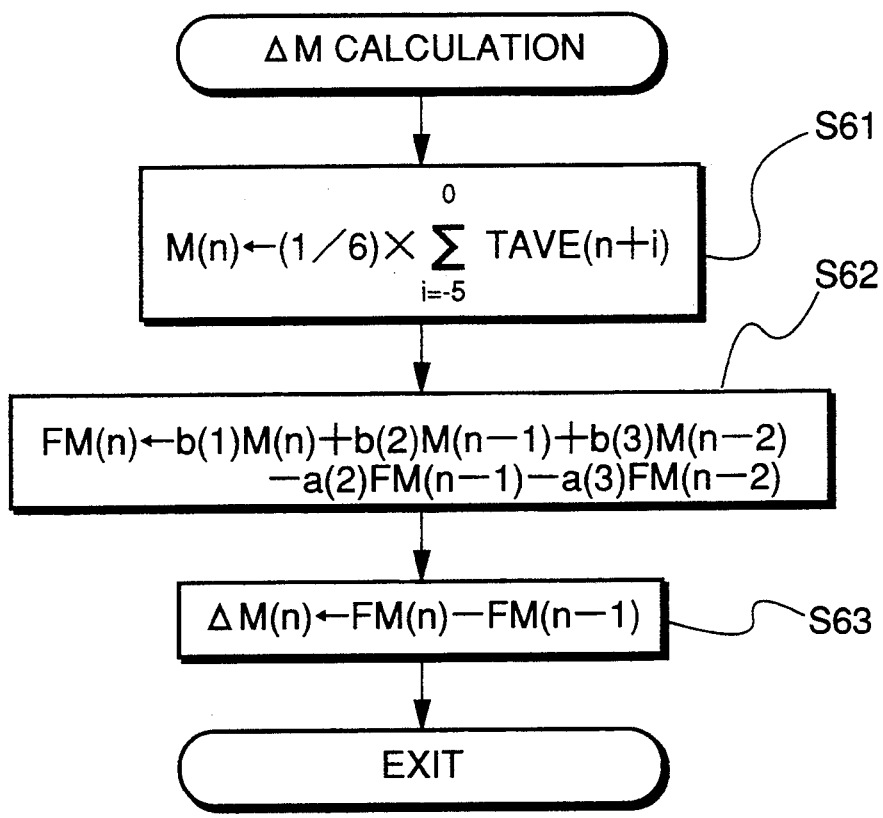
FIG. 10 is a flowchart showing a subroutine for calculating a parameter ΔM representative of a rate of variation in the engine rotational speed, which is executed at a step of the FIG. 7(c) program.

FIG. 10 shows a subroutine for calculating the rate of variation ΔM, which is executed at the step S44 of the FIG. 7(c) program.

At a step S61, a second average value M(n) is calculated by averaging six TAVE values from a value TAVE(n-5) obtained five loops before to a value TAVE(n) in the present loop, by the use of the following equation (5):

$$M(n) = 1/6 \times \sum_{i=-5}^{0} TAVE(n+i) \quad (5)$$

In the present embodiment, the engine 1 is a 4-cylinder/4-cycle engine, wherein spark ignition is carried out at any one of the cylinders (#1 cylinder to #4 cylinder) whenever the crankshaft rotates through 180 degrees. Therefore, the second average value M(n) is an average value obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S62, the second average value M(n) thus calculated is subjected to high-pass filtering by the use of the following equation (6), to obtain a high-pass filtered second average value FM(n):

FM(n)=b(1)×M(n)+b(2)×M(n-1)+b(3)×M(n-2)−a(2)FM(n-1)−a(B)FM(n-2)  (6)

where b(1) to b(3), a(2), and a(3) represent filter transmission coefficients, which assume, for example, 0.2096, −0.4192, 0.2096, 0.3557, and 0.1940, respectively. When n in the equation (3) assumes 0 or 1, FM(0) and FM(1) are set to zero, and therefore, the equation (3) is effectively applied when n assumes a value of 2 or more.

The high-pass filtered second average value FM(n) obtained as above is free of frequency components lower than about 10 Hz contained in the M(n) value, to thereby eliminate the adverse effect of vibrations (e.g. vibrations due to torsion of the crankshaft and road surface vibrations transmitted through wheels of a vehicle on which the engine is installed) transmitted from a driving system of the vehicle to the engine.

At a step S63, a rate of variation Δ(n) in the high-pass filtered second average value FM(n) is calculated by the use of the following equation (7):

$$\Delta M(n) = FM(n) - FM(n-1) \quad (7)$$

The high-pass filtered second average value FM(n) is inverted in sign from that of the M(n) value. Therefore, when a misfire has occurred in the engine 1, the M(n) value is increased, which in turn causes an increase in the FM(n) value in the negative direction and accordingly an increase in the Δ(n) value in the negative direction. An increase in the Δ(n) value in the negative direction indicates an increase in deceleration of the engine rotational speed.

Figure 11:
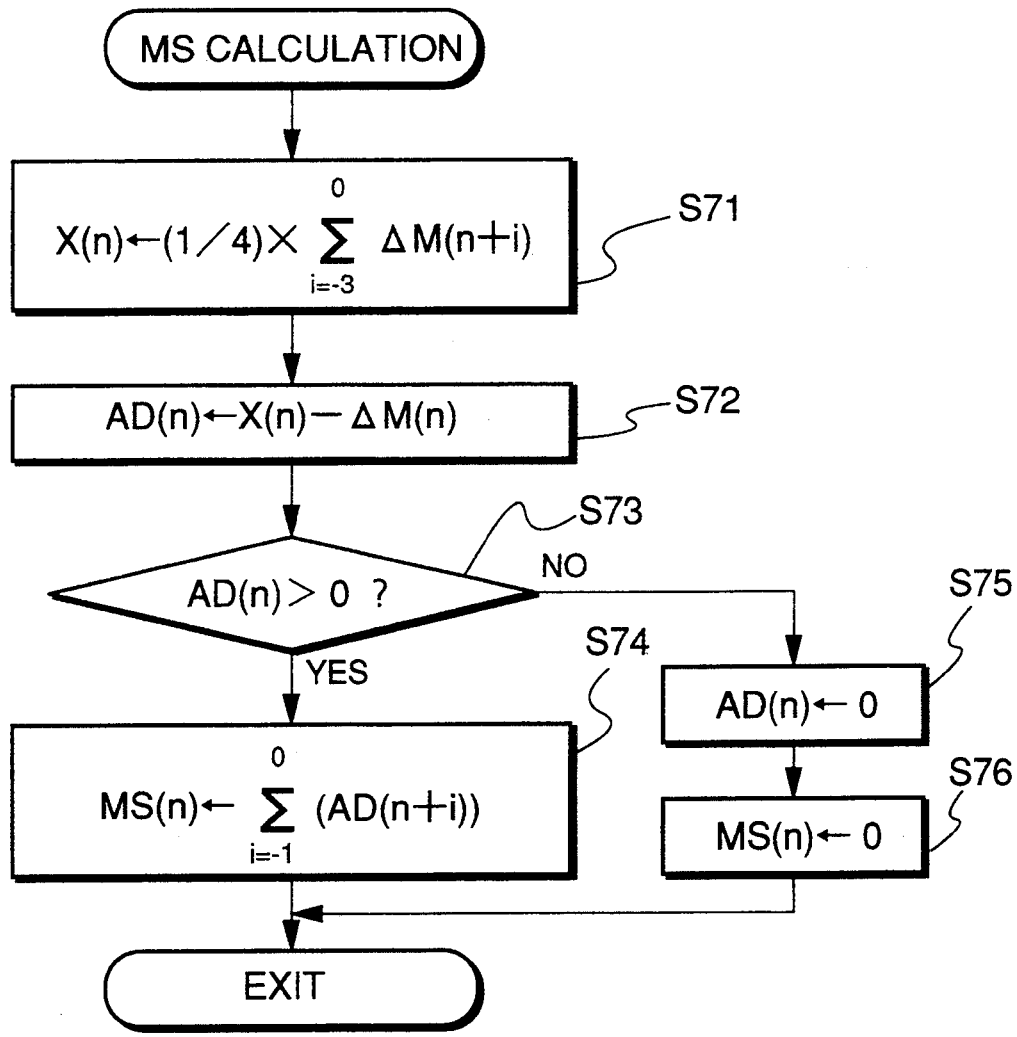
FIG. 11 is a flowchart showing a subroutine for calculating a cumulative value MS of a difference between the parameter ΔM and an average value thereof, which is executed at a step of the FIG. 7(c) program.

FIG. 11 shows a subroutine for calculating the cumulative value MS at the step S45 in the FIG. 7(c) program.

At a step S71, a variation rate average value X(n) is calculated, which is an average value of four ΔM values from a value ΔM(n-3) calculated three loops before the present loop to a value ΔM(n) in the present loop, by the use of the following equation (8):

$$X(n) = 1/4 \times \sum_{i=-3}^{0} \Delta M(n+i) \quad (8)$$

At the following step S72, a difference AD(n) between the variation rate average value X(n) and the rate of variation ΔM(n) is calculated by the use of the following equation (9):

$$AD(n) = X(n) - \Delta M(n) \quad (9)$$

Then, it is determined at a step S73 whether or not the difference AD(n) is larger than a value of 0. If AD(n)≦0 stands, the difference AD(n) is set to 0 at a step S75 and a value MS(n) is set to 0 at a step S76. The MS(n) value is a cumulative value of the differences AD(n).

If the answer to the question at the step S73 is affirmative (YES), i.e. if AD(n) >0, the cumulative value MS(n) is calculated by the use of the following equation (10):

$$MS(n) = \sum_{i=-1}^{0} AD(n+i) \quad (10)$$

According to the program in FIG. 11, if the difference AD(n) has a positive value, a value AD(n-1) obtained in the last loop is added to a value AD(n) obtained in the present loop to thereby obtain a cumulative value MS(n) thereof, i.e. the sum of the values AD(n-1) and AD(n), whereas if the difference AD(n) is equal to zero or negative, the value MS(n) is set to 0. Accordingly, only when the difference AD(n) is positive, i.e. only when the variation rate average value X(n) is larger than the rate of variation ΔM(n), more specifically, only when the rate of variation Δ M(n) is on the larger deceleration side of the engine rotational speed with respect to the average value X(n), the cumulative value MS(n) is calculated.

By using the thus calculated cumulative value MS(n), misfire determination is carried out as described hereinbelow. As a result, the influence of a variation in the engine rotational speed occurring after the engine rotational speed turns into the increasing direction can be eliminated, and therefore, misfire detection and misfiring cylinder discrimination can be easily and promptly carried out.

In the present embodiment, the time period over which the cumulative value MS(n) is calculated (cumulation period) is set to 360 degrees in terms of crank angle (time period corresponding to generation of two TDC pulses). This is for eliminating the influence of reactive variation in the angular velocity of the crankshaft due to a misfire.

Figure 12:
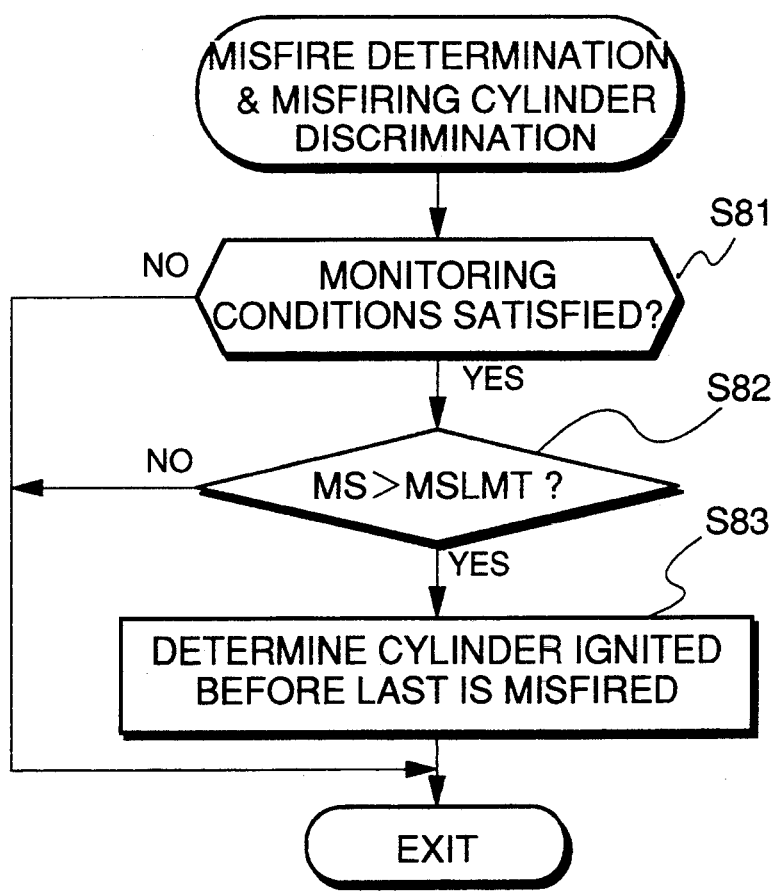
FIG. 12 is a flowchart showing a subroutine for carrying out a misfire determination and a misfiring cylinder discrimination which are executed at a step of the FIG. 7(c) program.

FIG. 12 shows a subroutine for carrying out the misfire determination and the misfiring cylinder discrimination, based on the cumulative value MS calculated as above, which is executed at the step S46 in the FIG. 7(c) program.

At a step S81, it is determined whether or not the aforesaid monitoring conditions are satisfied. If the monitoring conditions are not satisfied, the present program is immediately terminated.

If the monitoring conditions are satisfied, the program proceeds to a step S82, where it is determined whether or not the cumulative value MS is larger than the misfire-determining reference value MSLMT.

If the answer to the question at the step S82 is negative (NO), i.e. if $MS \leq MSLMT$ is satisfied, the program is immediately terminated. If the answer to the question of the step S82 is affirmative (YES), i.e. if $MS > MSLMT$ is satisfied, it is determined at a step S83 that a misfire has occurred in a cylinder where spark ignition took place in the loop before the last loop (two TDC signal pulses before the present loop). That is, as described hereinabove, the cumulative value MS is likely to increase as the deceleration of the engine rotational speed increases. Therefore, according to the present embodiment, when the cumulative value MS exceeds the reference value MSLMT, it is determined that a misfire has occurred.

As previously described, the misfire-determining reference value MSLMT is corrected to a smaller value as the deterioration degree of the catalyst increases, by the use of the aforesaid equation (3). Therefore, the possibility of determining that a misfire has occurred becomes higher as the deterioration degree of the catalyst increases, whereby the frequency at which it is determined that a misfire has occurred increases.

Accordingly, the possibility of determining that an abnormality exists, i.e. the engine is in a misfiring state, based on a misfiring rate determined as described hereinafter, becomes correspondingly higher, to thereby make it possible to take an appropriate failsafe action and hence avoid degradation in exhaust emission characteristics of the engine.

The reason why it is determined that a misfire has occurred in the cylinder ignited in the loop before the last loop is that the high-pass filtering causes a delay in obtaining the second average value FM(n). The delay may change depending on the type of high-pass filtering (filtering characteristics), and therefore, the misfiring cylinder discrimination should be carried out in a different manner dependent on the type of high-pass filtering (for example, the cylinder that should be determined to have misfired may be a cylinder ignited 3 TDC signal pulses before the present loop, or the cylinder ignited at the last TDC signal pulse).

Figure 13:
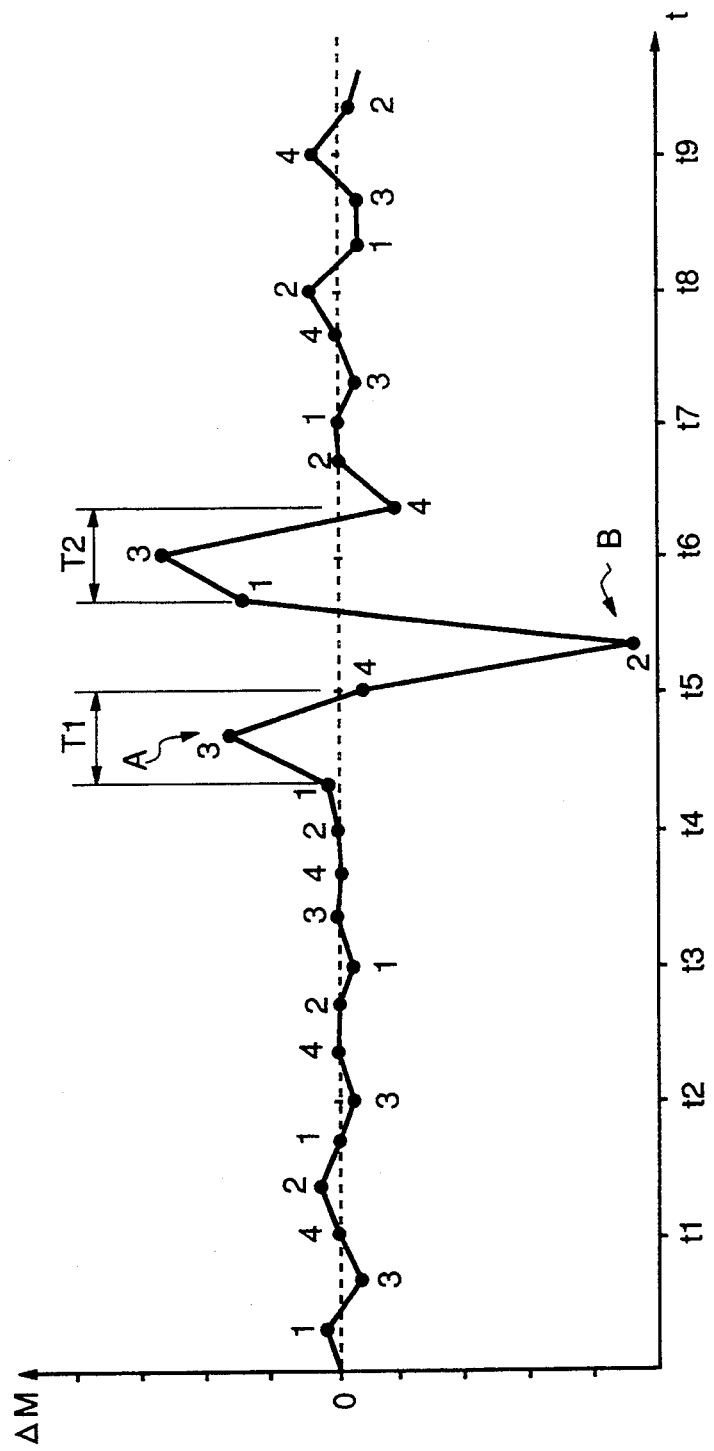
FIG. 13 is a diagram showing a change in the parameter ΔM in the event of occurrence of a misfire.
Figure 14:
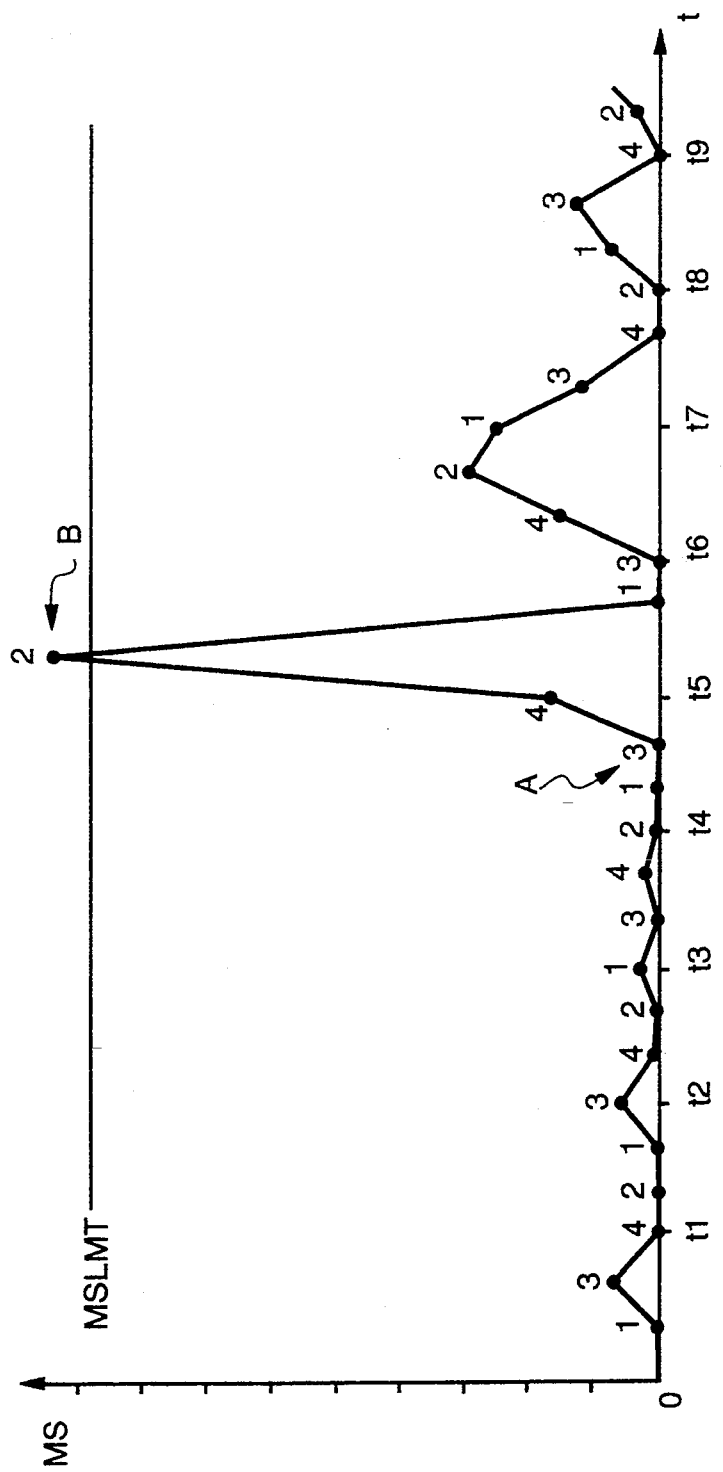
FIG. 14 is a diagram showing a change in the cumulative value MS.

FIG. 13 shows, by way of example, a change in the rate of variation $\Delta M$ with the lapse of time in the case where a single misfire has occurred in the #3 cylinder, and FIG. 14 shows a change in the cumulative value MS corresponding to the above change in the rate of variation $\Delta M$ with the lapse of time. In these graphs, time points t1 to t9 on the abscissas in the two figures correspond to each other, and numerals in the figures indicate numbers allotted to the cylinders where spark ignition took place.

In the illustrated example, as shown in FIG. 14, the cumulative value MS exceeds the reference value MSLMT when the #2 cylinder indicated by the arrow B is ignited. Therefore, it is determined that a misfire has occurred in the #3 cylinder indicated by the arrow A (cylinder where spark ignition took place two TDC signal pulses before).

Figure 15:
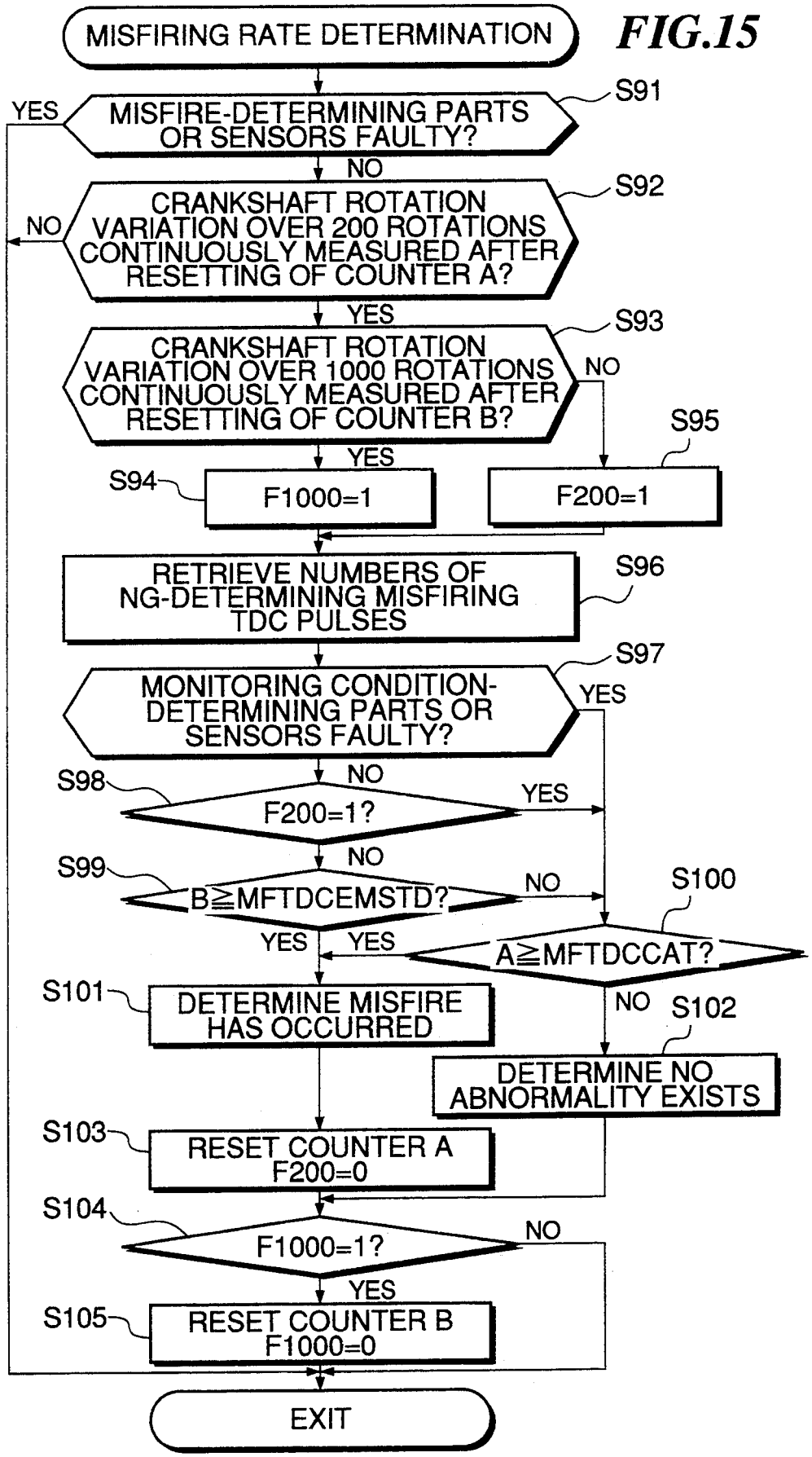
FIG. 15 is a flowchart showing a subroutine for carrying out a misfiring rate determination executed at a step in the FIG. 7(b) program.

FIG. 15 shows a subroutine for determining the misfiring rate, which is executed at the step S43 in the FIG. 7(b) program.

At a step S91, it is determined whether or not any of component parts and sensors used for misfire determination, i.e. the CRK sensor 11, the TDC sensor 12, the CYL sensor 13, and peripheral parts thereof, has been detected to be faulty. If none of the component parts and sensors have been detected to be faulty, it is determined at a step S92 whether or not the rate of variation $\Delta M$ has continuously been measured over 200 rotations of the crankshaft after a counter A to be reset at a subsequent step S103, referred to hereinafter, was reset. The counter A counts the number of times of determination that a misfire has occurred, over 200 rotations of the crankshaft.

If one or more of the sensors, etc. have been detected to be faulty or if the $\Delta M$ measurement over 200 rotations (hereinafter referred to as "the 200 rotation measurement") has not been completed, the program is immediately terminated. On the other hand, if the answer to the question at the step S92 is affirmative (YES), i.e. if the counter A has counted up the number of times of the 200 rotation measurement, it is determined at a step S93 whether or not the rate of variation $\Delta M$ has continuously been measured over 1000 rotations of the crankshaft after a counter B to be reset at a subsequent step S105, referred to hereinafter, was reset. The counter B counts the number of times of the determination that a misfire has occurred, over 1000 rotations of the crankshaft.

If the measurement of the number of times over 1000 crankshaft rotations (hereinafter referred to as "the 1000 rotation measurement") has not been completed, a flag F200 which indicates that only the 200 rotation measurement has been completed is set to "1" at a step S95, whereas if the 1000 rotation measurement has been completed, a flag F1000 which indicates completion of the 1000 rotation measurement is set to "1" at a step S94. At the following step S96, numbers of NG-determining misfiring TDC signal pulses MFTDCEMSTD and MFTDCCAT are retrieved respectively from an MFTDCEMSTD map and an MFTDCCAT map. The MFTDCEMSTD value is a first threshold value to be used for misfire determination at a step S99, referred to hereinafter, which corresponds to a misfiring rate (the number of times of misfire occurrence over 1000 rotations of the crankshaft) at and above which the amount of unburned exhaust gases exceeds an allowable reference value. The MFTDCCAT value is a second threshold value to be used for misfire determination at a step S100, referred to hereinafter, which corresponds to a misfiring rate (the number of times of misfire occurrence over 200 rotations of the crankshaft) at and above which the performance of the three-way catalyst 15 can be adversely affected. The first and second threshold values are in the relationship of MFTDCCAT/200 >MFTDCEMSTD/1000. The MFTDCEMSTD and MFTDCCAT maps have respective predetermined MFTDCEMSTD and MFTDCCAT values set in accordance with the engine rotational speed NE and the intake pipe absolute pressure PBA, to such values as become smaller with an increase in the NE value and/or an increase in the PBA value.

At the next step S97, it is determined whether or not any of component pares and sensors used for determination of the monitoring conditions (see the step S42 in FIG. 7), i.e. the engine coolant temperature 10, the intake air temperature sensor 9, the intake pipe absolute pressure sensor 8, the throttle valve opening sensor 4, the vehicle speed sensor, the atmospheric pressure sensor, and peripheral parts thereof, has been detected to be faulty. If one or more of the component parts and sensors have been detected to be faulty, only the misfiring rate determination based on the value of the counter A is executed at steps S100 to 102. More specifically, it is determined at the step S100 whether or not the value of the counter A is larger than the second threshold value MFTDCCAT. If A <MFTDCCAT, it is determined at the step S102 that the engine is normally operating, whereas if A≧MFTDCCAT, it is determined at the step S101 that the engine is abnormally operating, i.e. a misfire has occurred in the engine.

If the answer to the question at the step S97 is negative (NO), i.e. if no failure of the component parts and sensors has been detected, it is determined at a step S98 whether or not the flag F200 is set to "1" If F200="1", it means that the 1000 rotation measurement has not been completed. Therefore, the program proceeds to the step S100, where only the misfiring rate determination based on the value of the counter A is executed. On the other hand, if F200="0", it means that the 1000 rotation measurement has been completed. Therefore, first the misfiring rate determination based on the value of the counter B is executed at a step S99. That is, it is determined whether or not the value of the counter B exceeds the first threshold value MFTDCEMSTD. If B≧MFTDCEMSTD, it is determined at the step S101 that the engine is abnormally operating, whereas if B<MFTDCEMSTD, the program proceeds to the step S100.

At the following step S103, the counter A and the flag F200 are reset, and then the program proceeds to a step S104, where it is determined whether or not the flag F1000 is set to "1" If the answer to the question is negative (NO), the program is immediately terminated, whereas if the answer to the question is affirmative (YES), the counter B and the flag F1000 are reset at a step S105, followed by terminating the program.

According to the steps S97 to S102 of the FIG. 15 program, if none of the component parts and sensors for determination of the monitoring conditions have been detected to be faulty, both the determination based on the value of the counter A and the determination based on the value of the counter B are executed, whereas if any of the component parts and sensors has been detected to be faulty, only the determination based on the value of the counter A is executed. This is because, in the event of failure of one or more of the component parts and sensors for determination of the monitoring conditions, the accuracy of misfire determination cannot be fully guaranteed, and further there is a possibility that the air-fuel ratio of a mixture supplied to the engine deviates from the desired value to cause increased unburnt exhaust gas components. Consequently, if the misfire determination based on the counter B value is executed with degraded accuracy of detection of a misfire, there is a fear that a normal burning state is erroneously determined as a misfire.

If all the component parts and sensors for determination of the monitoring conditions are normal, the determination based on the value of the counter A is executed every 200 rotations of the crankshaft, and further the determination based on the value of the counter B is also executed every 1000 rotations of the crankshaft, whereby even an insignificant degree of abnormality can be positively detected.

As described hereinabove, according to the present embodiment, the misfire-determining reference value MSLMT is set to a smaller value, i.e. to a value at which the possibility of determining that a misfire has occurred becomes larger, as the determination time period TCHK becomes shorter, i.e. as the deterioration degree of the catalyst becomes larger. Therefore, the frequency at which it is determined that a misfire has occurred will increase as the deterioration degree of the catalyst becomes larger. Accordingly, the possibility of determining that the engine is in a misfiring state (abnormal state) based on the determined misfiring rate becomes higher, whereby it is possible to take an appropriate action to prevent the engine from having degraded exhaust emission characteristics. Thus, the degradation of the exhaust emission characteristics can be prevented beforehand, and also advancement of deterioration of the catalyst can be restrained, to thereby prevent the life of the catalyst from becoming shorter.

In the above described embodiment, the misfire-determining reference value MSLMT is corrected in accordance with the determination time period TCHK. However, in place of or in addition to correction of the MSLMT value by the TCHK value, the MSLMT value may be corrected in accordance with the first and second threshold values MFTDCEMSTD and MFTDCCAT for the misfiring rate determination.

Figure 6B:
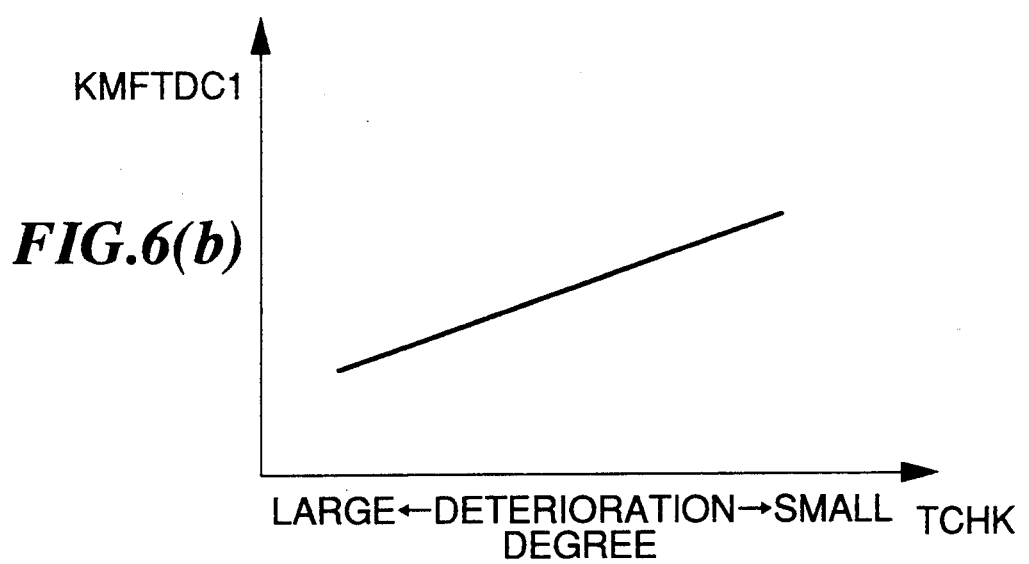
FIG. 6(b) is a graph showing the relationship between the TCHK value and another correction value KMFTDC1 for correcting the MSLMT value.

Specifically, the MFTDCEMSTD value and the MFTDCCAT value are calculated by the use of the following equations (10) and (11):

$$MFTDCEMSTD = MFTDCEMSTDM + KMFTDC1 \qquad (10)$$

$$MFTDCCAT = MFTDCCATM + KMFTDC2 \qquad (11)$$

where MFTDCEMSTDM and MFTDCCATM represent basic values read out from respective maps which are set in accordance with the engine rotational speed NE and the intake pipe absolute pressure PBA. KMFTDC1 represents a correction value calculated in accordance with the determination time period TCHK, as shown in FIG. 6(b), and set to a smaller value as the TCHK value becomes smaller (as the deterioration degree of the catalyst becomes higher). KMFTDC2 represents a correction value which is calculated in the same manner as the KMFTDC1 value.

As described hereinabove, according to the alternative method, by correcting the first and second threshold values MFTDCEMSTD and MFTDCCAT by the TCHK value, the threshold values are decreased as the deterioration degree of the catalyst increases, whereby the possibility of determining that the engine is in an abnormal state (misfiring state) becomes higher. Thus, the same effect as in the above described embodiment can be achieved.

Next, a second embodiment of the invention will be described with reference to FIGS. 16 to 19, wherein another method of detecting a misfire is employed. That is, in the present embodiment, sparking voltage is detected, and misfire occurrence is determined based on the detected sparking voltage.

Figure 16:
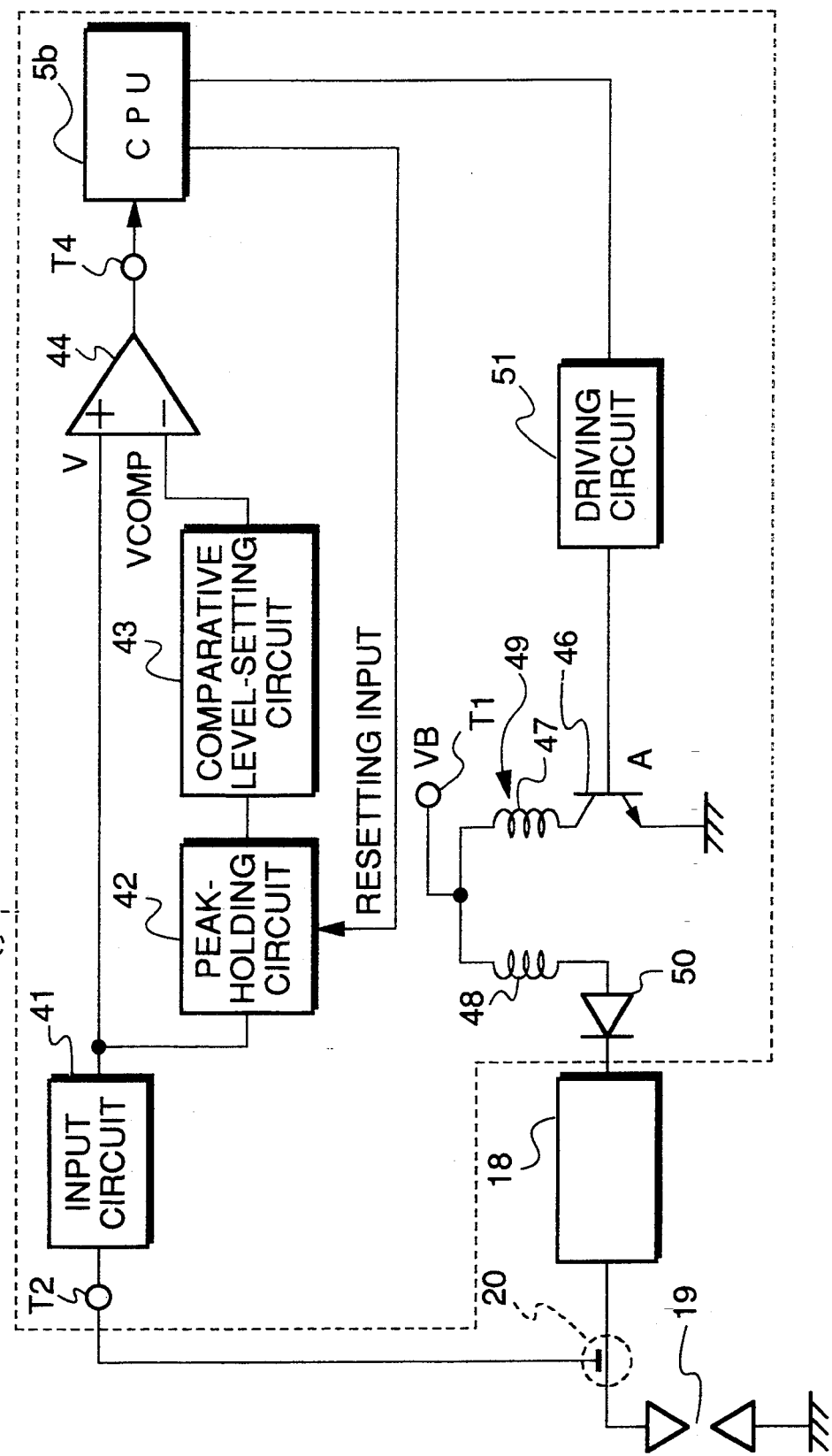
FIG. 16 is a circuit diagram showing the arrangement of a misfire-detecting circuit which detects a misfire from sparking voltage V, according to a second embodiment of the invention.

FIG. 16 shows the arrangement of a misfire-detecting circuit which detects a misfire based on the sparking voltage, according to the second embodiment. In the ECU 5, a feeding terminal T1 which is supplied with supply voltage VB from a battery is connected to an ignition coil (spark means) 49 comprised of a primary coil 47 and a secondary coil 48, which are connected with each other at ends thereof. The other end of the primary coil 47 is connected to a collector of a transistor 46. The transistor 46 has its base connected via a driving circuit 51 to the CPU 5b and has its emitter grounded. An ignition command signal A is supplied from the CPU 5b to the base of the transistor 46. Further, the other end of the secondary coil 48 is connected via a distributor 18 to a spark plug 19.

A sparking voltage sensor 20 is provided at an intermediate portion of a connecting line which connects between the distributor 18 and the spark plug 19. The sensor 20 is electrostatically coupled to the connecting line, and forms together therewith a capacitance of several pF's. The sparking voltage sensor 20 is connected via an input circuit 41 to a peak-holding circuit 42 and a non-inverting input terminal of a comparator 44. An output from the peak-holding circuit 42 is supplied via a comparative level-setting circuit 43 to an inverting input terminal of the comparator 44. Further, the peak-holding circuit 42 is electrically connected via a resetting input terminal to the CPU 5b, and supplied therefrom with a resetting signal to have reset a held peak value at suitable timing. An output from the comparator 44 is supplied to the CPU 5b via a terminal T4. Further, a diode 50 is interposed between the secondary coil 48 and the distributor 18.

The input circuit 41 is comprised of a voltage-dividing circuit, buffer amplifier, etc. and shifts the input from the sparking voltage sensor 20 to a suitable level. An output voltage from the input circuit 41 will be hereinafter referred to as "the sparking voltage V"

According to the circuit in FIG. 16, a peak value of the detected sparking voltage V is held by the peak-holding circuit 42, and the held peak value is multiplied by a value smaller than 1 at the comparative level-setting circuit 43 into a comparative level VCOMP, which is supplied to the comparator 44. Therefore, the terminal T4 connected to the comparator is supplied with a pulse signal (comparison result pulse) which is at a high level when V>VCOMP is satisfied.

The operations of the circuits 41 to 44 constructed as above will be described with reference to FIGS. 17(a) to 17(e). In FIGS. 17(b) and 17(c), the solid lines indicate characteristics obtained during normal combustion of the air-fuel mixture, while the broken lines indicate characteristics obtained upon occurrence of a misfire attributable to the fuel supply system.

Figure 17A:
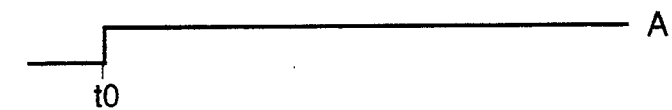
Figure 17B:
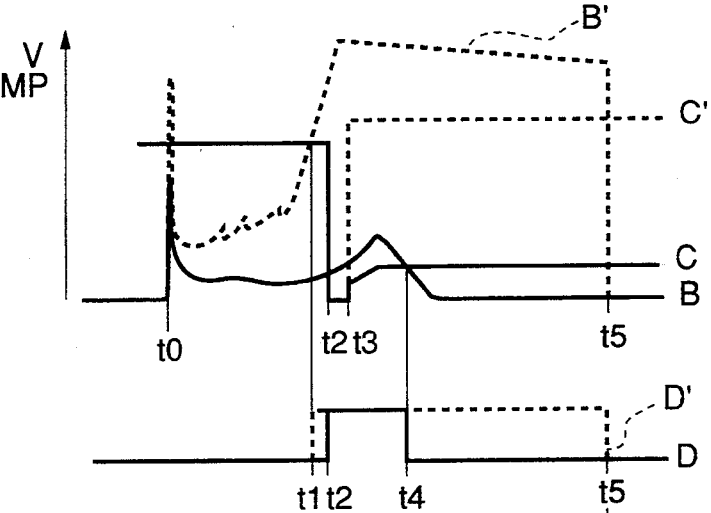
Figure 17C:
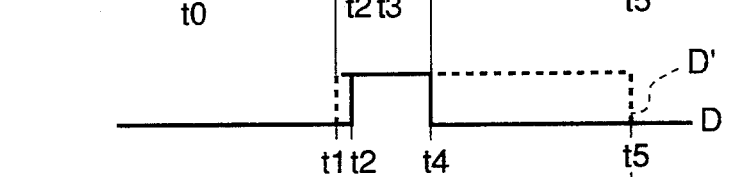
Figure 17D:
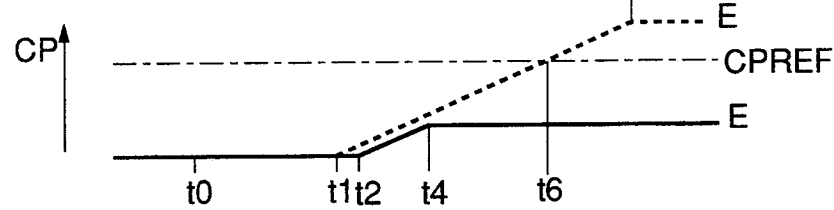
Figure 17E:

FIG. 17(a) shows the ignition command signal A.

FIG. 17(b) shows changes in the detected sparking voltage (output voltage from the input circuit 41) V (B, B') and the comparative level VCOMP (C, C') with the lapse of time.

As is apparent from the figures, when a misfire has occurred (broken line B'), breakdown voltage within the spark plug becomes higher than breakdown voltage assumed at normal burning, so that the sparking voltage V becomes higher than that assumed at normal burning. When a misfire occurs, the sparking voltage V is maintained at a high level during the latter stage of discharge by virtue of the action of the diode 50.

The curves C and C' in FIG. 17(b) show changes in the comparative level VCOMP with the lapse of time, obtained from the held peak value of the sparkling voltage V. The peak-holding circuit 13 is reset over a time period between time points t2 and t3. Therefore, the curves C, C' before the time point t2 show the comparative level VCOMP obtained from the last cylinder that was subjected to ignition. FIG. 17(c) shows an output from the comparator 44 (hereinafter referred to as "comparison result pulse"). As is clear from FIGS. 17(b) and 17(c), at normal firing, V>VCOMP holds over a time period between time points t2 and t4, whereas at a misfire, V>VCOMP holds over a time period between time points t1 and t5, during which time periods the output from the comparator 44 has a high level.

Therefore, it is possible to determine occurrence of a misfire by measuring the pulse duration of the comparison result pulse output from the comparator 44, and comparing the measured pulse duration with a reference value CPREF.

Figure 18:
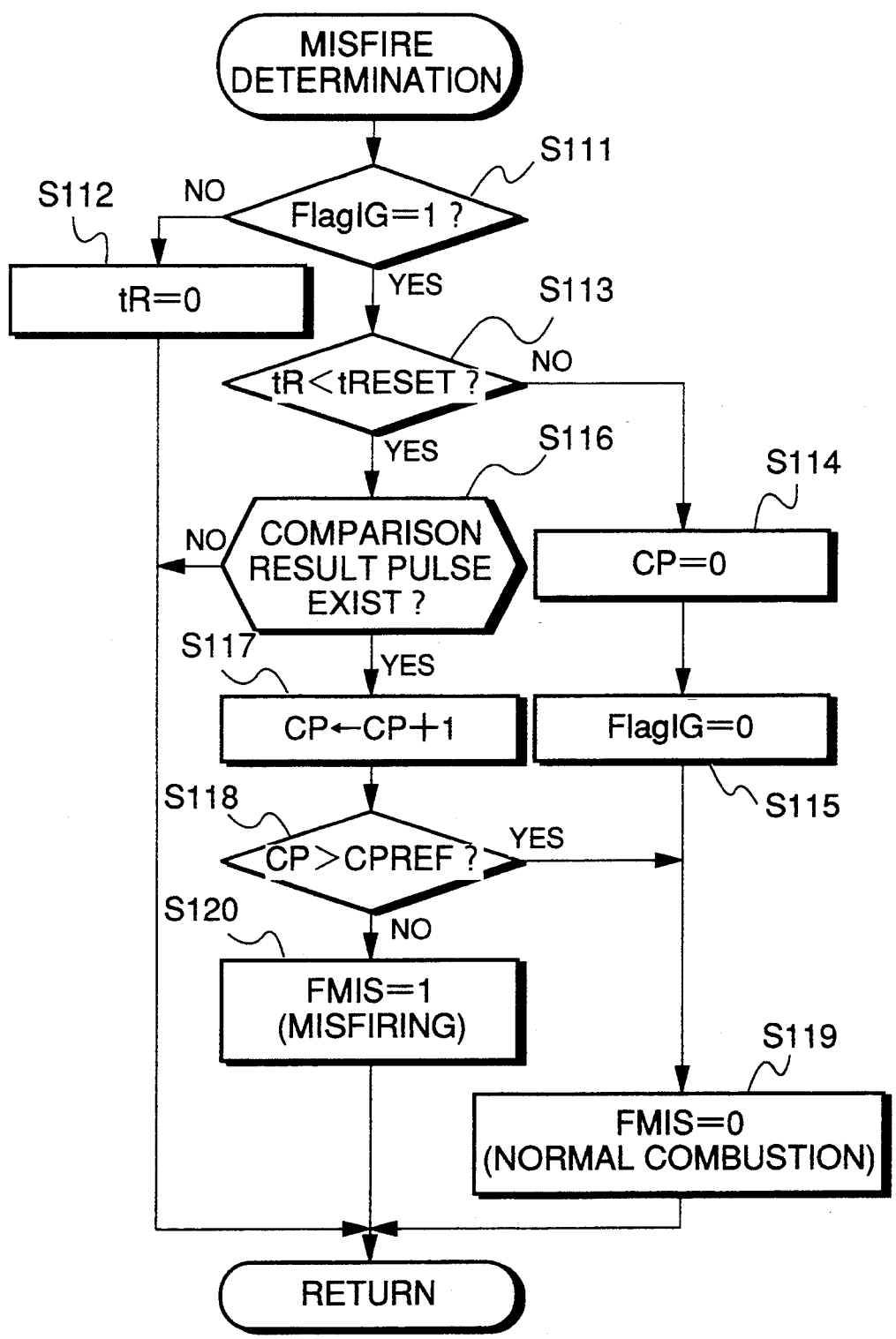
FIG. 18 is a flowchart showing a program for carrying out a misfire determination, by means of the circuit in FIG. 16.

FIG. 18 shows a program for determining occurrence of a misfire, based on the comparison result pulse, which is executed by the CPU 5b at predetermined fixed intervals.

At a step S111, it is determined whether or not a flag IG is set to "1" If the flag IG is set to "0" a count value tR of a resetting timer is reset at a step S112, followed by terminating the program. If the answer to the question at the step S111 is affirmative (YES), i.e. if the IG flag is set to "1", it is determined at a step S113 whether or not the count value tR of the resetting timer is smaller than a predetermined time period tRESET. Immediately after the flag IG has been changed from "0" to "1", the answer to this question is affirmative (YES), and then at a step S116, it is determined whether or not the comparator 44 is generating a high level output, i.e. the comparison result pulse. If the answer to the question is negative (NO), the program is immediately terminated, whereas if the answer to the question is affirmative (YES), a count value CP of a pulse duration counter is incremented by 1 at a step S117, and then it is determined at a step S118 whether or not the resulting count value CP is smaller than a reference value CPREF.

If the answer to the question at the step S118 is affirmative (YES), i.e. if CP<CPREF, it is determined that a normal firing has occurred, and a flag FMIS is set to "0" at a step S119. On the other hand, if the answer is negative (NO), i.e. if CP≧CPREF, it is determined at a step S120 that a misfire has occurred and the flag FMIS is set to "1", followed by terminating the program.

If the answer to the question at the step S113 is negative (NO), i.e. if tR≧tRESET, the count value CP of the pulse duration counter is reset at a step S114, and the flag IG is reset at a step S115, followed by the program proceeding to the step S119.

According to the program of FIG. 18 described above, as shown in FIGS. 17(d) and 17(e), the count value CP does not exceed the reference value CPREF at a normal firing, the former exceeds the latter at a misfiring, e.g. at a time point t6 in the illustrated example, whereupon a misfire is determined to have occurred, and then the flag FMIS is changed from "0" to "1".

Figure 19:
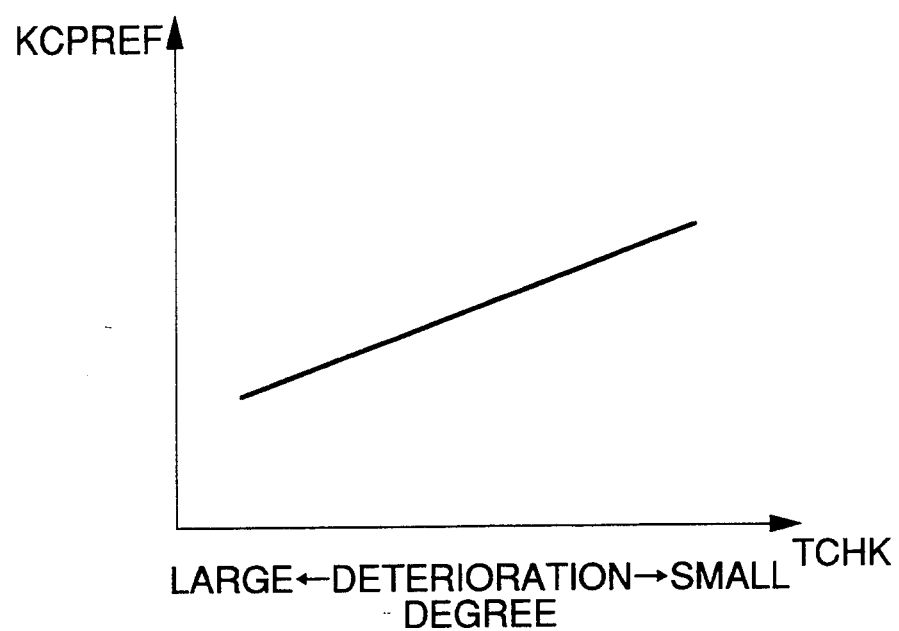
FIG. 19 is a graph showing the relationship between the parameter TCHK and a correction value KCPREF for correcting the MSLMT value.

The reference value CPREF is calculated by the use of the following equation:

$$CPREF = CPREFM + KCPREF \qquad (12)$$

where CPREFM is a basic value read out from a map which is set in accordance with the engine rotational speed NE and the intake pipe absolute pressure PBA. KCPREF is a correction value calculated based on the determination time period TCHK, which is set to a smaller value as the TCHK value becomes smaller (as the deterioration degree of the catalyst becomes higher), as shown in FIG. 19.

The misfiring rate determination according to the present embodiment is performed similarly to the program of FIG. 15, except for the steps S92 and S93 in FIG. 15. That is, in the present embodiment, detection of the sparking voltage is carried out in place of measurement of change in the crankshaft rotation at the steps S92 and S93 in FIG. 15.

Therefore, in the present embodiment, similarly to the first embodiment described hereinbefore, the frequency of the determination that a misfire has occurred increases with advancement of the deterioration degree of the catalyst, whereby the same effect described hereinbefore is achieved as in the first embodiment.

To detect occurrence of a misfire, alternatively of the above described method, an ionic current method, which detects a misfire based on an amount of ionic current generated by sparking of the spark plug, may be employed. When the ionic current method is used, the misfire-determining reference value may also be set to such a value as increases the possibility of determining that a misfire has occurred, with advancement of the deterioration degree of the catalyst.

What is claimed is:

1. A misfire-detecting system for an internal combustion engine having an exhaust system, and a catalytic converter arranged in said exhaust system, comprising:

misfire parameter-detecting means for detecting a value of a parameter representative of a misfiring state of said engine;

catalyst deterioration degree-detecting means for detecting a deterioration degree of said catalytic converter;

misfire-determining reference value-setting means for setting a misfire-determining reference value, based on the deterioration degree of said catalytic converter detected by said catalyst 15 deterioration degree-detecting means; and misfire-determining means for comparing between the value of said parameter detected by said misfire parameter-detecting means and said misfire-determining reference value, and for determining whether said engine is in a misfiring state, based on a result of said comparison.

2. A misfire-detecting system as claimed in claim 1, wherein said misfire-determining reference value-setting means sets said misfire-determining reference value such that as the detected deterioration degree of said catalytic converter is higher, the probability that said engine is determined to be in said misfiring state increases.

3. A misfire-detecting system as claimed in claim 1, wherein said parameter detected by said misfire parameter-detecting means comprises a parameter indicative of rotational speed variations of said engine.

4. A misfire-detecting system as claimed in claim 1, wherein said parameter detected by said misfire parameter-detecting means comprises a parameter indicative of sparking voltage generated in said engine.

5. A misfire-detecting system as claimed in any of claims 1 to 4, including oxygen concentration-detecting means arranged in said exhaust system downstream of said catalytic converter, and wherein said catalyst deterioration degree-detecting means detects the deterioration degree of said catalytic converter, based on an inversion time period of an output from said oxygen concentration-detecting means.

6. A misfire-detecting system as claimed in claim 5, wherein said misfire-determining reference value-setting means sets said misfire-determining reference value, based on said inversion time period of said output from said oxygen concentration-detecting means.

7. A misfire-detecting system as claimed in any of claims 1 to 4, further including counter means for measuring a misfiring rate of said engine over a predetermined number of rotations of said engine, engine abnormality-determining means for determining that said engine is in an abnormal state, when said misfiring rate of said engine measured by said counter means exceeds a misfiring rate reference value, and misfiring rate reference value-setting means for setting said misfiring rate reference value, based on the deterioration degree of said catalytic converter detected by said catalyst deterioration degree-detecting means.

8. A misfire-detecting system as claim in claim 7, wherein said misfiring rate reference value comprises at least one of a first reference value at and above which an amount of unburnt gases emitted from said engine exceeds a maximum allowable amount, and a second reference value at and above which said catalytic converter is badly affected by occurrence of misfiring in said engine.

9. A misfire-detecting system for an internal combustion engine having an exhaust system, and a catalytic converter arranged in said exhaust system, comprising:

misfire parameter-detecting means for detecting a value of a parameter representative of a misfiring state of said engine;

catalyst deterioration degree-detecting means for detecting a deterioration degree of said catalytic converter;

misfire-determining reference value-setting means for setting a misfire-determining reference value;

misfire-determining means for comparing between the value of said parameter detected by said misfire parameter-detecting means and said misfire-determining reference value, and for determining whether said engine is in a misfiring state, based on a result of said comparison;

counter means for measuring a misfiring rate of said engine over a predetermined number of rotations of said engine;

engine abnormality-determining means for determining that said engine is in an abnormal state, when said misfiring rate measured by said counter means exceeds a misfiring rate reference value; and misfiring rate reference value-setting means for setting said misfiring rate reference value, based on the deterioration degree of said catalytic converter detected by said catalyst deterioration degree-detecting means.

\* \* \* \* \*